US008776370B2

(12) United States Patent
Staroselsky et al.

(10) Patent No.: US 8,776,370 B2
(45) Date of Patent: Jul. 15, 2014

(54) METHOD OF MAINTAINING GAS TURBINE ENGINE COMPONENTS

(75) Inventors: Alexander V. Staroselsky, Avon, CT (US); Richard Pettit, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 1532 days.

(21) Appl. No.: 12/398,979

(22) Filed: Mar. 5, 2009

(65) Prior Publication Data

US 2010/0223788 A1 Sep. 9, 2010

(51) Int. Cl.

*B23P 6/00* (2006.01)
*B24C 1/00* (2006.01)

(52) U.S. Cl.

USPC ... 29/889.1; 29/889.2; 29/402.06; 29/81.021; 29/81.08; 29/81.09; 451/36; 451/40

(58) Field of Classification Search

USPC ........ 29/889.1, 889.2–889.61, 889.7, 889.71, 29/889.72, 889.721, 889.722, 402.01, 29/402.03, 402.04, 403.05, 402.06, 29/402.18, 81.09, 81.07, 81.01, 81.02, 29/81.021, 81.08; 451/36, 37–40

See application file for complete search history.

(56) References Cited

U.S. PATENT DOCUMENTS 3,025,189 A 3/1962 Arden
3,216,857 A 11/1965 Duvall
3,400,017 A 9/1968 Huebner et al.
3,607,398 A 9/1971 Lucas
4,008,844 A 2/1977 Duvall et al.
4,065,322 A 12/1977 Langford
4,439,241 A 3/1984 Ault et al.
5,290,364 A 3/1994 Stein et al.
5,341,602 A * 8/1994 Foley .............................. 451/64
5,391,256 A 2/1995 Hansen et al.
5,441,574 A 8/1995 Hansen et al.
5,575,858 A 11/1996 Chen et al.
5,702,288 A * 12/1997 Liebke et al. .................. 451/36
5,707,453 A 1/1998 Shurman et al.
6,004,620 A * 12/1999 Camm .......................... 427/142
6,368,060 B1 * 4/2002 Fehrenbach et al. ........ 416/97 R
6,575,817 B2 * 6/2003 Czech ............................ 451/61
6,663,919 B2 * 12/2003 Farmer et al. ................ 427/453
6,805,140 B2 10/2004 Velez, Jr. et al.
7,144,302 B2 * 12/2006 Bolz et al. ...................... 451/36

(Continued)

FOREIGN PATENT DOCUMENTS

EP 0761386 3/1997

OTHER PUBLICATIONS

Fatigue Damage Alleviation by Intermittent Electroplating, E.A. McKinnon, Journal of Testing and Evaluation, JTEVA, vol. 4, No. 1, Jan. 1976, pp. 57-60.

High Cycle Fatigue Crack Propagation Rates in Copper, Yoshifumi Nakano and B.I. Sandor, Journal of testing and Evaluation, JTEVA, vol. 2, No. 3, May 1974, pp. 196-221.

(Continued)

*Primary Examiner* — Sarang Afzali

(74) *Attorney, Agent, or Firm* — Carlson, Gaskey & Olds, P.C.

(57) ABSTRACT

An example method of maintaining a serviceable component of a gas turbine engine includes selecting a used component, using a fluid to move an abrasive against a surface of the used component, and removing material from the used component using the abrasive. In one example, the method moves the abrasive against the surface of the used component when the used component is installed within the gas turbine engine.

15 Claims, 3 Drawing Sheets

(56) References Cited

U.S. PATENT DOCUMENTS

| | | | | |
|---|---|---|---|---|
| 7,185,662 | B2 | 3/2007 | Succop | |
| 2005/0235493 | A1 * | 10/2005 | Philip et al. | 29/889.1 |
| 2006/0111025 | A1 | 5/2006 | Yanaka et al. | |

OTHER PUBLICATIONS

Extended European Search Report for European Application No. 10250111.1 dated Sep. 12, 2013.

* cited by examiner

METHOD OF MAINTAINING GAS TURBINE ENGINE COMPONENTS

BACKGROUND

This application relates generally to maintaining a used gas turbine engine component to extend the life of the used component, wherein fluid carrying an abrasive is used to smooth a surface of the used component.

Gas turbine engines are known and typically include multiple sections, such as a fan section, a compression section, a combustor section, a turbine section, and an exhaust nozzle section. The engine includes blade arrays mounted for a rotation about an engine axis. The blade arrays include multiple individual blades that extend radially from a mounting platform to a blade tip. Rotating the blade arrays compresses air in the compression section. The compressed air mixes with fuel and is combusted in the combustor section. The products of combustion expand to rotatably drive blade arrays in the turbine section. The engine also includes vane sections having multiple individual blades that guide airflow though the engine. Operating the engine fatigues components of the engine. The components often roughen in areas of high stress as they fatigue, a process which if left unchecked can proceed until cracks initiate in the components.

To avoid operating the engine with cracked components, technicians typically replace the used components in the engine with new components. Determining when to replace the components involves statistically estimating a minimum useful life of the components (i.e., the minimum period of use before cracks would develop in the component). Technicians then monitor use of the components and remove the components from the engine before they reach their minimum useful life. The removed components are replaced with new, repaired, or used serviceable components. As known, replacing components is costly and time consuming.

SUMMARY

An example method of maintaining a serviceable component of a gas turbine engine includes selecting a used component, moving a fluid that entrains an abrasive material against a surface of the used component, and removing material from the used component using the abrasive material. In one example, the method moves the abrasive material against the surface of the used component when the used component is installed within the gas turbine engine.

An example maintained used component of a gas turbine engine has a surface at least partially formed by an abrasive material entrained by a fluid. The surface is smoother than a fatigued surface of the component that is at least partially formed by operating the gas turbine engine.

These and other features of the example disclosure can be best understood from the following specification and drawings, the following of which is a brief description.

DETAILED DESCRIPTION

Figure 1:
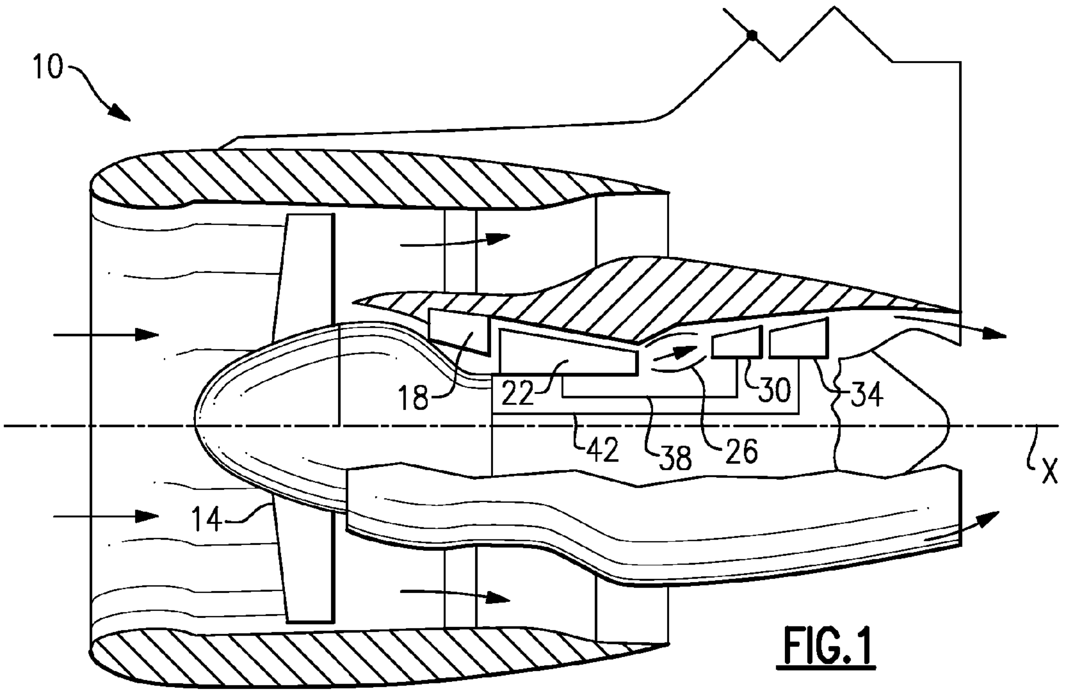
FIG. 1 shows a schematic view of an example gas turbine engine.

FIG. 1 schematically illustrates an example gas turbine engine 10 including (in serial flow communication) a fan section 14, a low-pressure compressor 18, a high-pressure compressor 22, a combustor 26, a high-pressure turbine 30, and a low-pressure turbine 34. The gas turbine engine 10 is circumferentially disposed about an engine centerline X. During operation, air is pulled into the gas turbine engine 10 by the fan section 14, pressurized by the compressors 18 and 22, mixed with fuel, and burned in the combustor 26. The turbines 30 and 34 extract energy from the hot combustion gases flowing from the combustor 26.

In a two-spool design, the high-pressure turbine 30 utilizes the extracted energy from the hot combustion gases to power the high-pressure compressor 22 through a high speed shaft 38. The low-pressure turbine 34 utilizes the extracted energy from the hot combustion gases to power the low-pressure compressor 18 and the fan section 14 through a low speed shaft 42. The examples described in this disclosure are not limited to the two-spool architecture described and may be used in other architectures, such as a single-spool axial design, a three-spool axial design, and still other architectures. That is, there are various types of engines that could benefit from the examples disclosed herein, which are not limited to the design shown.

Figure 2:
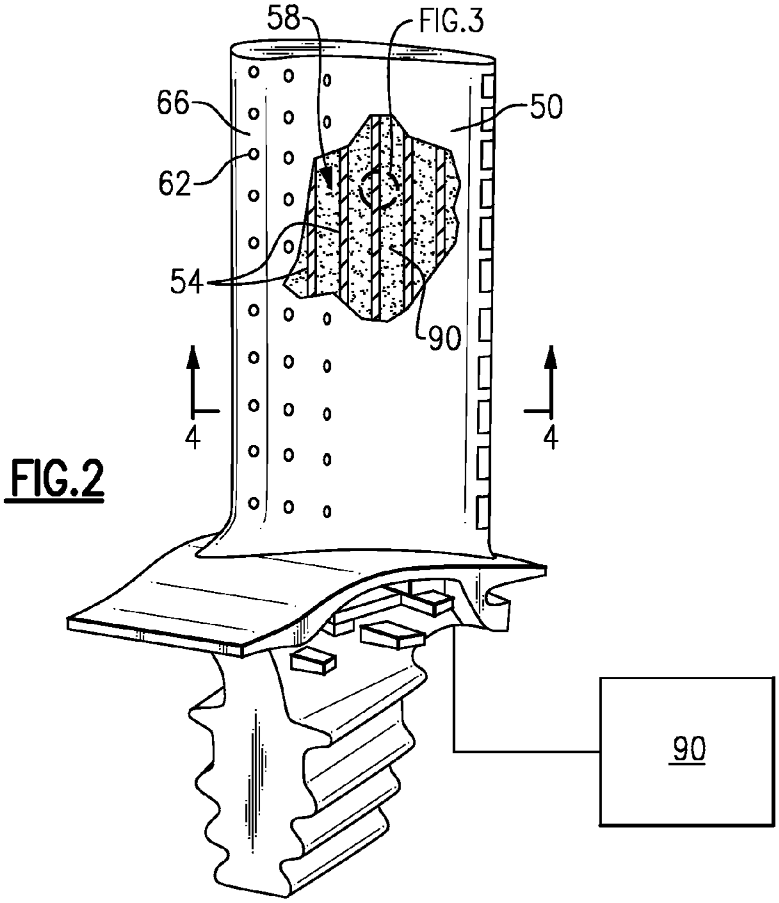
FIG. 2 shows a perspective view of an example serviceable component from the FIG. 1 engine.
Figure 3A:
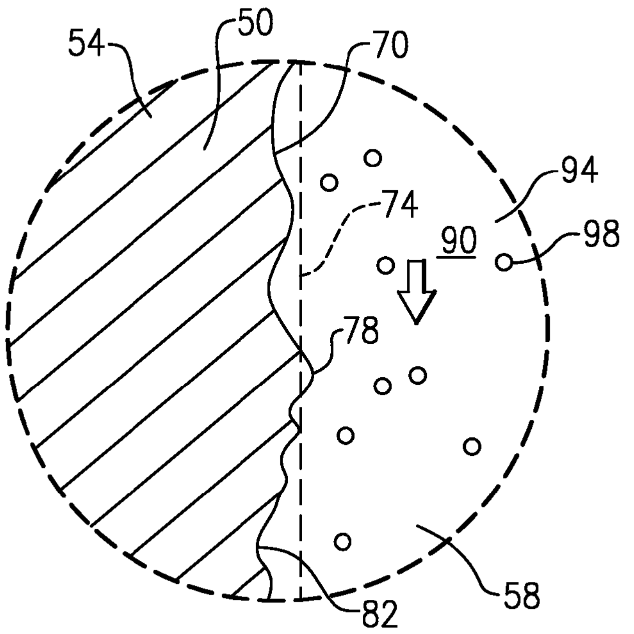
FIG. 3A shows a fatigued surface of the FIG. 2 serviceable component compared to a former surface.
Figure 3B:
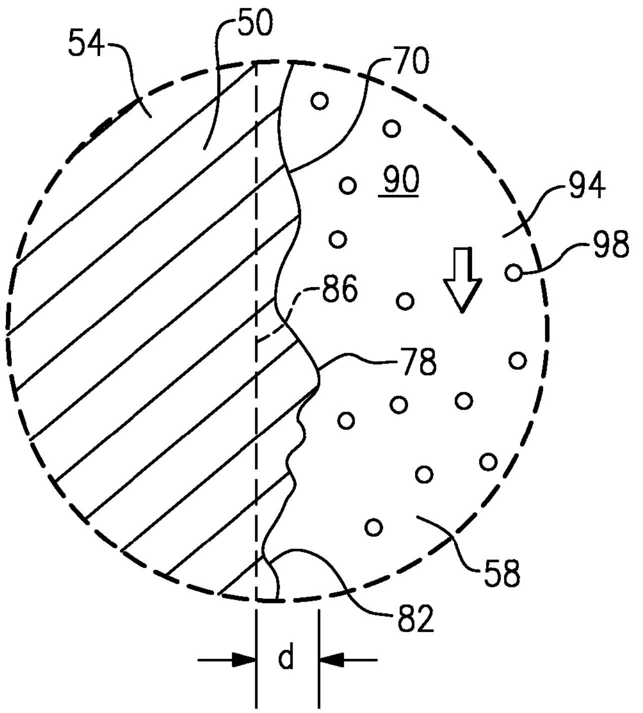
FIG. 3B shows the fatigued portion of the FIG. 2 serviceable component compared to a maintained surface.
Figure 4:
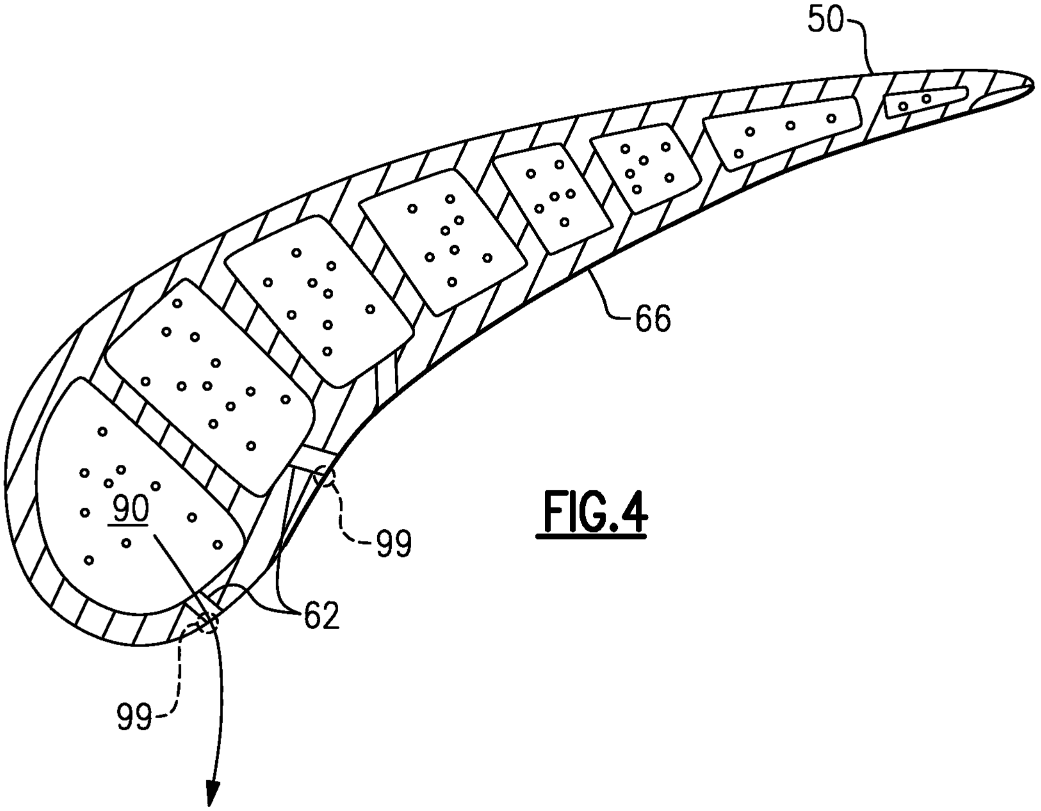
FIG. 4 shows a section view at line 4-4 of the FIG. 2 serviceable component.

Referring to FIGS. 2-4 with continuing reference to FIG. 1, an example serviceable component 50 of the engine 10 includes a plurality of internal walls 54 establishing cooling channels 58 that are configured to communicate a cooling flow of air through the serviceable component 50 when the engine 10 is operating. The flow of air moves from the cooling channels 58 through a plurality of film cooling holes 62 established in an outer shell 66 of the serviceable component 50.

In this example, the serviceable component 50 is a used blade of the engine 10. Other examples of the serviceable component 50 include used vanes, used disks, etc. The serviceable component 50 is generally described as any component of the engine 10 that is susceptible to fatigue crack initiation due to surface roughness.

As known, using the serviceable component 50 within the engine 10 wears the serviceable component 50, which results in a fatigued surface 70. A dashed line 74 represents a former surface of the serviceable component 50, which, in this example, represents the surface of the serviceable component 50 when the serviceable component 50 was manufactured and prior to using the serviceable component 50 within the engine 10. Using the serviceable component 50 thus wears the former surface to the fatigued surface 70. In some examples, the more the serviceable component 50 is used, the rougher the fatigued surface 70 becomes.

The fatigued surface 70 being rougher than the former surface means, in this example, that there is more variation in the fatigued surface 70 than in the former surface. For example, the fatigued surface 70 includes an extrusion 78 corresponding to a portion of the fatigued surface 70 that extends past the former surface, and an intrusion 82 corresponding to a portion of the fatigued surface 70 extending away from the former surface. Relative differences between a position of the extrusion 78 and a position of the intrusion 82 represent variation in the fatigued surface 70. As known, the roughness of the fatigued surface 70 can undesirably facilitate crack formation in the serviceable component 50.

In some examples, the roughness of the fatigued surface 70 is microscopic. The roughness in the figures has been exaggerated in this example for clarity. The fatigued surface 70 is also an internal surface of the serviceable component 50 in this example. In another example, the fatigued surface 70 is an external surface of the serviceable component 50 or a surface of another component of the engine 10. Compressor disks are an example of the serviceable component 50 having external surfaces that are fatigued.

During maintenance of the serviceable component 50, material beyond a reference line 86 is removed from the serviceable component 50 to establish a maintained surface that is smoother than the fatigued surface 70. The maintained surface, which is aligned with the reference line 86, is smoother than the fatigued surface 70. Accordingly, the maintained surface discourages crack nucleation more than the fatigued surface 70. Discouraging crack formation extends the useful life of the serviceable component 50.

The maintained surface being smoother than the fatigued surface 70 means generally that there is less variation in the maintained surface than in the fatigued surface 70. In this example, both the extrusions 78 and the intrusions 82 are removed from the serviceable component 50 to establish the maintained surface. In another example, the size of the extrusions 78 and the intrusions 82 is reduced to establish the maintained surface. A reduction in relative differences between a position of the extrusion 78 and a position of the intrusion 82 smoothes the fatigued surface 70.

In this example, a solution 90 including a fluid 94 that entrains an abrasive 98 is communicated through the cooling channel 58 of the serviceable component 50 to smooth the fatigued surface 70. The abrasive 98 removes portions of the serviceable component 50 as the solution 90 passes over the serviceable component 50. The fluid 94 has a paste-like consistency in one example. The fluid 94 then entrains the removed portions of the serviceable component 50 away from the serviceable component 50.

The example solution 60 is a liquid honing solution. Some examples of the solution 60 that are suitable for communicating through the serviceable component 50 separate from other portions of the engine 10 utilize an aluminum oxide (or similar light abrasive) and have the paste-like consistency. ExtrudeHone™ is one example of such a solution 60.

Examples of the solution 60 that are suitable for communicating through the serviceable component 50 within the engine 10 also utilize aluminum oxide, but as a smaller percentage (e.g., 5%) of the solution 60. The other portion of the solution 60 is typically water but may include other cleaning agents in some examples.

In one example, the distance d between the extrusion 78 and the maintained surface is between 1 and 5 microns. Thus removing no more than 5 microns of material from some areas of the serviceable component 50 can provide the maintained surface. In addition to removing portions of the serviceable component 50, the example abrasive 98 also removes byproducts of combustion, such as oxidation resulting from operation of the engine 10.

In one example, communicating the solution 90 through the internal channels 58 involves introducing the solution 90 to the engine 10 while the engine 10 is operating. For example, the solution 90 can be sprayed at the engine 10 while the engine 10 is operating. In such an example, air and the solution 90 are both pulled into the engine 10. The solution 90 then circulates through the engine 10, including the internal channels 58, to smooth the fatigued surface 70 of the serviceable component 50 or other components, such as airfoil ribs, cooling holes, etc. Another rinsing solution (not shown) is circulated through the engine 10 in some examples to remove any remaining material associated with the solution 90 moving through the engine 10. In such an example, the solution 90 also refinishes exterior portions of the engine 10 as the solution 60 is sprayed at the engine 10 and moves against the exterior portions.

The figures show the serviceable component 50 separate from other portions of the engine 10 for clarity. However, the example solution 90 moves through the cooling channels of the serviceable component 50 while the serviceable component 50 is installed within the engine 10 in this example. Other examples move solution through the serviceable component 50 while the serviceable component 50 is uninstalled or while the serviceable component 50 is partially installed.

Referring to FIG. 4, the abrasive 98 within the solution 90 moving through the film cooling holes 62 removes material from the serviceable component 50 in areas 99 to soften or polish areas of the serviceable component 50 near the exits of the film cooling holes 62. The polishing reduces the edge curvature radius near the exits, which reduces the material stress in the serviceable component 50 near the film cooling holes 62. In one example, smoothing the serviceable component 50 in areas 99 by 5 microns increases the period of expected use before detectable cracks initiate in the serviceable component 50 by 30%-50%.

Figure 5:
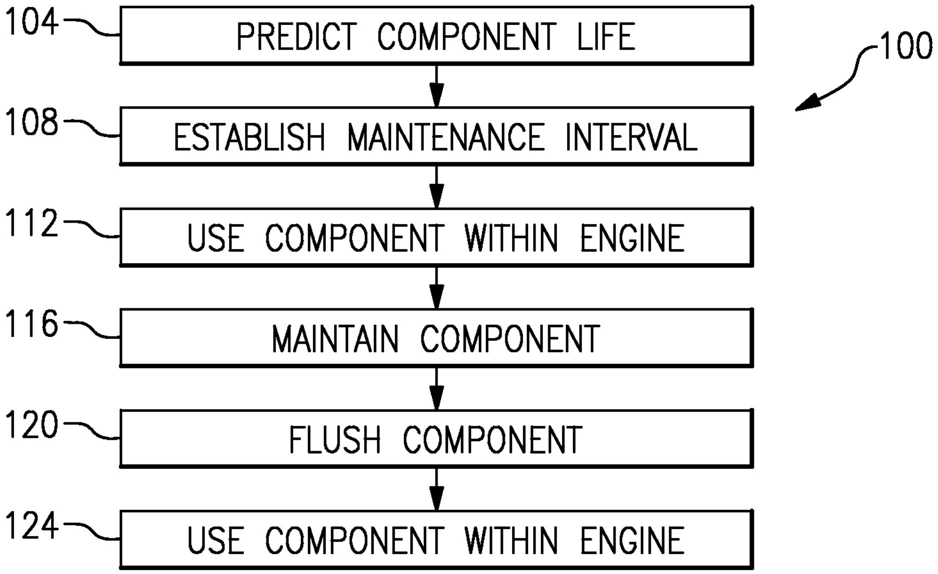
FIG. 5 shows a flow chart of an example method of maintaining the serviceable component.

A flow chart of an example maintenance method 100 is shown in FIG. 5. At step 104, the predicted life of a serviceable component is determined. In this example, the predicted life represents the number of hours of use that would cause cracks to form in the serviceable component if the surfaces of the serviceable component were not maintained. Other examples include a period of time, etc.

At step 108, a maintenance interval for the serviceable component is established. In some examples, the maintenance interval is between 40% and 70% of the predicted life of the serviceable component. In a more specific example, the serviceable component is a turbine blade and the maintenance interval ranges between 50% and 60% of the predicted life of the turbine blade. At 112, the serviceable component is used within the engine. A surface of the serviceable component is maintained at step 116 after the serviceable component use corresponds to the maintenance interval established in step 108.

In this example, surface smoothing techniques utilizing an abrasive entrained within a fluid are utilized to maintain the serviceable component. Step 116 may or may not include removing the serviceable component from an installed position within the engine. In some examples, the serviceable component, such as a blade, remains installed within the engine as the fluid moves across the surface of the serviceable component. In other examples, the serviceable component is removed or partially removed from the engine and placed on a stand. The abrasive entrained within the fluid then moves through external surfaces and surfaces establishing internal passages of the serviceable component while the serviceable component is secured relative to the stand.

At step 120, fluid moves across the serviceable component to flush remaining solution or residue from the engine. In the examples where the serviceable component is removed or partially removed from the engine, step 120 takes place while the serviceable component is on the stand. The step 120 of flushing or rinsing limits damage to seals and bearings within the engine due to residual material from the step 116.

The serviceable component is then used again within the engine at step 124, which, if the serviceable component was removed from the engine for service, requires removing the serviceable component from the stand and reinstalling the serviceable component within the engine.

Features of the disclosed embodiment include maintaining serviceable components to extend their useable life by smoothing surfaces of the serviceable components to inhibit crack formation.

Although a preferred embodiment has been disclosed, a worker of ordinary skill in this art would recognize that certain modifications would come within the scope of this invention. For that reason, the following claims should be studied to determine the true scope and content of this invention.

We claim:

1. A method of maintaining a serviceable component of a gas turbine engine, comprising:

selecting a used component;

moving a fluid that entrains an abrasive material against a surface of the used component;

removing material from the used component using the abrasive material that is in contact with the surface of the used component, wherein the step of removing smooths the surface of the used component that is in contact with the abrasive material; and moving the fluid against the surface by operating the gas turbine engine to circulate the fluid, wherein the used component defines a film cooling hole having an exit with an edge curvature radius, and the step of removing reduces the edge curvature radius to reduce material stress, wherein the used component is attached to the gas turbine engine in an installed position during the step of moving the fluid and the step of removing material.

2. The method of claim 1, wherein the used component is a used blade.

3. The method of claim 1, including removing byproducts of combustion using the fluid.

4. The method of claim 1, wherein the surface comprises an interior surface of the used component.

5. The method of claim 1, wherein removing material includes removing no more than 5 microns from the used component.

6. The method of claim 1, including spraying the fluid at the gas turbine engine.

7. The method of claim 1, wherein the selecting comprises selecting based on about 50% of a predicted life of the serviceable component of the component having been used.

8. The method of claim 1, wherein the selecting is based on an amount of use of the used component.

9. The method of claim 1, wherein the removing reduces susceptibility to crack nucleation.

10. The method of claim 1, wherein the fluid has a paste-like consistency.

11. The method of claim 1, wherein the fluid is a paste.

12. The method of claim 1, wherein the fluid comprises a mixture of air and a separate solution containing aluminum oxide.

13. The method of claim 1, wherein the step of removing lessens variations between an extrusion of the surface and an intrusion of the surface.

14. A method of maintaining a serviceable component of a gas turbine engine, comprising:

selecting a used component having a fatigued surface;

moving a fluid that entrains an abrasive material against the fatigued surface;

lessening variations between extrusions of the fatigued surface and intrusions of the fatigued surface by removing material from fatigued surface using the abrasive material; and moving the fluid against the fatigued surface by operating the gas turbine engine to circulate the fluid, wherein the used component defines a film cooling hole having an exit with an edge curvature radius, and the step of removing reduces the edge curvature radius, wherein the used component is in an installed position within the gas turbine engine during the moving.

15. The method of claim 14, wherein the fatigued surface is a surface of a base material, and the step of lessening variations removes some, but not all, of the base material.

* * * * *